United States Patent [19]

DeWoskin

[11] 3,997,920

[45] Dec. 21, 1976

[54] DRESS SHIELD

[75] Inventor: Irvin S. DeWoskin, St. Louis, Mo.

[73] Assignee: Beltx Corporation, Barnhart, Mo.

[22] Filed: Aug. 19, 1975

[21] Appl. No.: 605,912

[52] U.S. Cl. .................................................. 2/53
[51] Int. Cl.² ........................................ A41D 27/12
[58] Field of Search ................................. 2/53, 56

[56] References Cited

UNITED STATES PATENTS

| 317,626 | 5/1885 | Canfield | 2/53 |
| 1,291,073 | 1/1919 | Miller | 2/53 |
| 2,005,232 | 6/1935 | Marsh | 2/53 |
| 2,165,359 | 7/1939 | Eisenberg | 2/53 |
| 3,345,643 | 10/1967 | Bradley | 2/53 |

FOREIGN PATENTS OR APPLICATIONS

| 368,457 | 2/1923 | Germany | 2/56 |

Primary Examiner—Alfred R. Guest
Attorney, Agent, or Firm—Koenig, Senniger, Powers and Leavitt

[57] ABSTRACT

A dress shield consisting of two pieces of composite material each generally of crescent shape having a concave inner edge and a convex outer edge, each piece being cut from a laminated material consisting of a central waterproof barrier layer of a flexible heat-sealable plastic film and outer layers of spun-bonded polyester. The pieces are disposed flatwise one against the other with their corresponding edges in register, and are seamed together in face-to-face relation along their concave inner edges by a continuous heat seal, the latter being formed by ultrasonically sewing the concave edges together.

4 Claims, 3 Drawing Figures

DRESS SHIELD

BACKGROUND OF THE INVENTION

This invention relates to dress shields, more particularly armpit shields, and their manufacture.

Generally, dress shields have heretofore been made of two panels each comprising a central layer of plastic film (or rubber) and outer layers of woven material, e.g., woven cotton fabric, the panels being sewn together by needle and thread along concave inner edges thereof, and stitched (serged) all around their outer edges to prevent ravelling of the fabric layers. The plastic (or rubber) layer is needed for waterproofness. Since the stitching results in the formation of needle holes in the plastic (or rubber) layer, it is necessary to sew the panels together along their concave edges in such manner as to form a special reversed type of seam to avoid penetration of moisture through the needle holes. Also, the prior shields are not adapted to be trimmed, since this removes the serging and subjects them to ravelling of their fabric layers.

SUMMARY OF THE INVENTION

Among the several objects of this invention may be noted the provision of an improved dress shield which does not have any needle holes at all subject to moisture penetration; the provision of such a shield which may be fabricated without any reversed seaming operations, thereby simplifying the manufacture and reducing its cost; the provision of such a shield which does not requires any serging; and the provision of such a shield which may be trimmed as desired by the user, without being prone to ravelling; and the provision of such a shield which is smooth, non-bulky and comfortable to wear, readily laundered, and quick-drying, and which does not require ironing.

In general, a dress shield of this invention comprises two pieces of composite material each having a concave inner edge and an outer edge, with each piece being formed of a laminated material comprising a central waterproof barrier layer of a flexible heat sealable plastic film and outer layers of spun-bonded polyester (which is heat-sealable) bonded to the central layer. The two pieces are disposed flatwise one against the other with their concave inner edges generally in register with one another, and are seamed together in face-to-face relation along their concave inner edges by a heat seal extending along said concave edges and otherwise being free of one another. According to the method of this invention, the two pieces are heat sealed to seam them together continuously along their concave edges by ultrasonically sewing them together.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
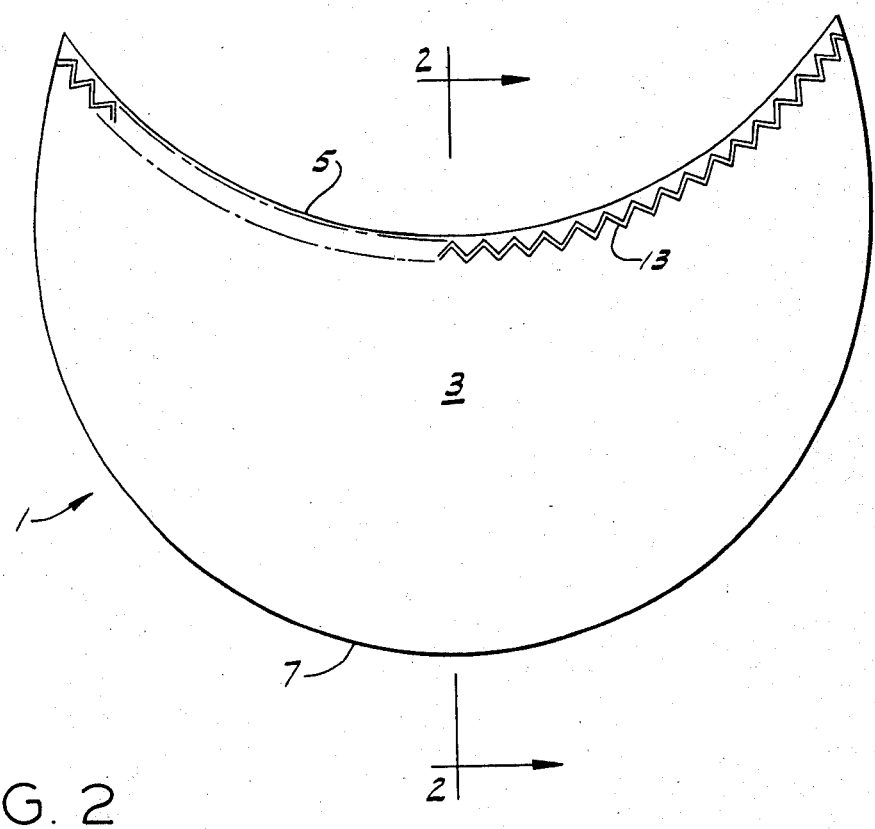
FIG. 1 is a view in elevation of one face of a dress shield of this invention, the other face being the same.

Referring to the drawings, a dress shield of this invention, designated in its entirety by the reference numeral 1 in FIG. 1, is shown to comprise two pieces or panels each designated 3 of composite material, each of these pieces or panels being generally of crescent shape having a concave edge 5 which constitutes its inner edge and a convex outer edge 7.

Figure 3:
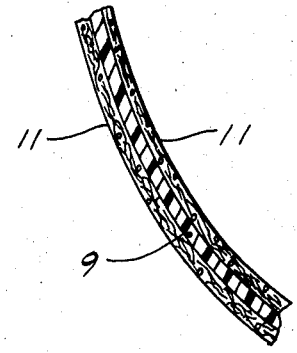
FIG. 3 is an enlarged fragment of FIG. 2.

Each of the two pieces 3 of the shield is formed of a laminated material comprising a central waterproof barrier layer 9 (see FIG. 3) of a flexible heat-sealable plastic film sandwiched between two outer layers each designated 11, of a spun-bonded polyester material, these outer layers being bonded to the central layer. The central layer 9 is preferably a layer of polyurethane film, although it will be understood that other suitable heat-sealable plastic film may be used. The outer layers may be of any suitable commercially available spun-bonded polyester. These layers and the central polyurethane layer, all of which are heat-sealable, are laminated by sandwiching the polyurethane between the polyester layers and applying heat and pressure thermoplastically to bond the layers together. Then, the pieces 3 are cut from the resultant laminate. No serging of the cut pieces is needed since the polyester layers, being spun-bonded, are non-woven as opposed to being woven and thus are not prone to ravel.

Figure 2:
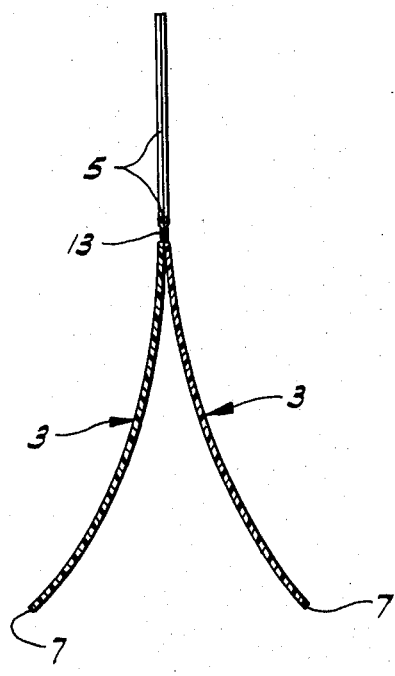
FIG. 2 is a section on line 2—2 of FIG. 1.

The two pieces 3 are assembled by disposing them flatwise one against the other with their concave inner edges 5 generally in register with one another, and their convex outer edges 7 generally in register with one another, and the pieces are seamed together in face-to-face relation along their concave inner end edges 5 by a heat seal 13 extending along these edges, otherwise being free of one another for being folded outwardly one away from the other at the heat seal. The heat seal 13 is continuous all along the concave edges 5 and, as shown in FIG. 1, is a zigzag heat seal made in accordance with the method of this invention by ultrasonically sewing the edges together. This ultrasonic sewing may be quickly, easily and efficiently carried out utilizing an ultrasonic sewing machine such as the Model 300 Sonic Sewing Machine sold by Branson Sonic Power Company of Danbury, Connecticut, and such as disclosed in U.S. Pat. No. 3,666,599 issued May 30, 1972. The zigzag stitch used herein is shown at the left in FIG. 3, of said patent, and is formed by using a wheel such as indicated at 24 in FIG. 2 of said patent having a zigzag sewing pattern on its rim.

The shield 1, having the outer layers 5 of spun-bonded polyester and the central layer of polyurethane film (which may be quite thin) is soft, non-bulky and comfortable to wear, readily laundered, and quick-drying, and does not require ironing. Having been ultrasonically sewn, instead of stitched with needle and thread, it has no needle holes subject to penetration of moisture. Thus, the seal at 13, which seals the layers of polyester and polyurethane together all along the concave edges, not only presents no openings through either of the pieces 3 of the shield but also completely blocks a potential flow path between the upper margins of the pieces. Also, the shield is made simply by assembling the pieces 3 flatwise and feeding them through the ultrasonic sewing machine without any reverse seaming operations, this greatly simplifying the manufacturing process and reducing the cost. The user may trim the pieces 3 as desired (e.g., cut off part of the pieces at edges 7) without subjecting them to ravelling since, as above noted, the non-woven polyester layers are not prone to ravel.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A dress shield comprising two pieces of composite material each having a concave inner edge and an outer edge, each piece being formed of a laminated material comprising a central waterproof barrier layer of flexible heat-sealable plastic film and outer layers of spunbonded polyester material bonded to said central layer, said pieces being disposed flatwise one against the other with their concave inner edges generally in register with one another, said pieces being seamed together in face-to-face relation along their said concave inner edges by a heat seal extending along said concave edges, and otherwise being free of one another for being folded outwardly one away from the other at the heat seal, the heat seal being continuous all along said concave edges and extending through the polyester material on the outside of one piece, the plastic film layer of said one piece, the polyester material on the inside of said one piece, the polyester material on the inside of the other piece, the plastic film layer of said other piece, and the polyester material on the outside of said other piece.

2. A dress shield as set forth in claim 1 wherein said continuous heat seal is a zigzag seal.

3. A dress shield as set forth in claim 1 wherein the central layer is formed of polyurethane film.

4. A dress shield as set forth in claim 1 wherein each of said pieces are generally of crescent shape, the outer edge of each piece being convex, and capable of being trimmed without being prone to ravelling.

* * * * *